United States Patent
Baker et al.

(10) Patent No.: US 11,050,229 B2
(45) Date of Patent: Jun. 29, 2021

(54) VAPOR SEAL WITH ANGLED FLANGE

(71) Applicant: ALLIED MOULDED PRODUCTS, INC., Bryan, OH (US)

(72) Inventors: Tony Baker, Waterloo, IN (US); Gregg Laukhuf, Bryan, OH (US)

(73) Assignee: ALLIED MOULDED PRODUCTS, INC., Bryan, OH (US)

(*) Notice: Subject to any disclaimer, the term of this patent is extended or adjusted under 35 U.S.C. 154(b) by 75 days.

(21) Appl. No.: 16/412,899

(22) Filed: May 15, 2019

(65) Prior Publication Data
US 2020/0021093 A1 Jan. 16, 2020

Related U.S. Application Data

(60) Provisional application No. 62/698,331, filed on Jul. 16, 2018.

(51) Int. Cl.
  *H02G 3/08* (2006.01)
  *H02G 3/12* (2006.01)

(52) U.S. Cl.
  CPC ............ *H02G 3/088* (2013.01); *H02G 3/123* (2013.01)

(58) Field of Classification Search
  USPC ........................................................ 174/502
  See application file for complete search history.

(56) References Cited

U.S. PATENT DOCUMENTS

| | | | | |
|---|---|---|---|---|
| 2,997,520 A | * | 8/1961 | Kinsman | H01R 13/447 174/67 |
| 3,049,688 A | * | 8/1962 | Sinopoli | H01R 25/006 439/41 |
| 3,166,332 A | * | 1/1965 | Olson | F16J 15/106 277/644 |
| 3,622,029 A | * | 11/1971 | Ware | H02G 3/086 220/3.7 |
| 3,794,278 A | * | 2/1974 | Frey, Jr. | F16L 5/00 248/27.3 |
| 4,158,420 A | * | 6/1979 | Balkwill | H02G 3/088 220/3.3 |
| 4,192,520 A | * | 3/1980 | Hasegawa | F02F 7/006 277/591 |
| 4,296,870 A | * | 10/1981 | Balkwill | H02G 3/126 174/57 |

(Continued)

OTHER PUBLICATIONS

Vapor Boxes brochure from Arlington.

*Primary Examiner* — William H. Mayo, III
*Assistant Examiner* — Krystal Robinson
(74) *Attorney, Agent, or Firm* — Shumaker, Loop & Kendrick, LLP; James D. Miller

(57) ABSTRACT

An electrical box includes an open end providing access to a hollow interior of the electrical box, that is enclosed by a closed end and opposing sidewalls. The electrical box has an angled flange that is integrally molded to create a singular construct formulated from a polymer material. The angled flange is angled along the longitudinal axis relative to the upstanding sides of the electrical box and flattens completely when placed into a final installed position within an aperture within a structure to create a vapor seal between the electrical box and the structure. Also, the polymer material the flange is created from accommodates any small inconsistencies in dimensions, alignment and the like, so as to allow for fast and efficient installation.

17 Claims, 2 Drawing Sheets

(56) References Cited

U.S. PATENT DOCUMENTS

| | | | | |
|---|---|---|---|---|
| 4,345,693 A * | 8/1982 | Balkwill | H02G 3/088 | |
| | | | 220/3.3 | |
| 4,408,695 A * | 10/1983 | Balkwill | H02G 3/088 | |
| | | | 174/57 | |
| 4,724,281 A * | 2/1988 | Nix | H02G 3/123 | |
| | | | 174/53 | |
| 4,757,158 A * | 7/1988 | Lentz | H02G 3/088 | |
| | | | 174/53 | |
| 4,819,953 A * | 4/1989 | Joh | F02B 77/00 | |
| | | | 277/591 | |
| 5,536,018 A * | 7/1996 | Szott | F16J 15/104 | |
| | | | 277/313 | |
| 5,628,419 A * | 5/1997 | Putz | H02G 3/123 | |
| | | | 220/3.3 | |
| 6,071,142 A * | 6/2000 | Blackman | H01R 13/6395 | |
| | | | 439/373 | |
| 6,194,657 B1 * | 2/2001 | Gretz | H02G 3/123 | |
| | | | 174/53 | |
| 6,209,836 B1 | 4/2001 | Swanson | | |
| 6,239,365 B1 * | 5/2001 | McEvers | H02G 3/088 | |
| | | | 174/50 | |
| 6,437,241 B1 * | 8/2002 | Neujahr | H02G 3/088 | |
| | | | 174/58 | |
| 6,561,522 B1 * | 5/2003 | Radelet | F16J 15/021 | |
| | | | 277/314 | |
| 6,908,003 B2 * | 6/2005 | Feyes | H02G 3/088 | |
| | | | 174/53 | |
| 9,258,919 B1 * | 2/2016 | Rose | H01R 24/20 | |
| 9,635,773 B1 * | 4/2017 | Marshall | H01R 27/02 | |
| 9,822,894 B2 * | 11/2017 | Bayyouk | F16K 25/005 | |
| 10,236,668 B2 * | 3/2019 | Stahl, II | H02G 3/0412 | |
| 2004/0182857 A1 * | 9/2004 | Feyes | H02G 3/121 | |
| | | | 220/3.2 | |
| 2010/0012371 A1 | 1/2010 | Solan | | |
| 2013/0264088 A1 | 10/2013 | Dinh | | |
| 2016/0172832 A1 * | 6/2016 | Geno | H02G 3/086 | |
| | | | 174/502 | |
| 2018/0123332 A1 * | 5/2018 | Laukhuf | H02G 3/123 | |
| 2018/0351336 A1 * | 12/2018 | Broere | H01R 24/76 | |
| 2019/0013659 A1 * | 1/2019 | Drane | H02G 3/081 | |

* cited by examiner

VAPOR SEAL WITH ANGLED FLANGE

CROSS-REFERENCE TO RELATED PATENT APPLICATIONS

This patent application claims the benefit of U.S. Provisional Patent Application Ser. No. 62/698,331, filed on Jul. 16, 2018. The entire disclosure of the above patent application is hereby incorporated herein by reference.

FIELD OF THE INVENTION

The present invention relates to electrical boxes such as currently used for mounting electrical devices in walls, floors and ceilings, and more particularly to a vapor seal for an electrical box.

BACKGROUND OF THE INVENTION

An electrical box is used in building construction for enclosing electrical components such as switches, outlets and electrical appliance connections. The electrical box is generally secured to studs or joists in a wall, ceiling or floor construction with an open front or face of the electrical box facing toward an interior of a room. When the electrical box is utilized, a vapor barrier provided in the wall to prevent ambient air from entering into a structure or a building through the wall must be at least partially penetrated during the mounting of the box.

One method of providing the vapor barrier in external walls and ceilings of a building is to provide a vapor seal comprising a continuous plastic sheet between the studs and the drywall of the building. The vapor seal forms an entirely encompassing vapor barrier around an exterior wall of the building to prevent undesired leakage of air into or out of the building. However, the use of the electrical box requires penetration of the vapor seal, as well as the layers of drywall provided adjacent the vapor seal. Heretofore, it is extremely difficult to provide a vapor seal between the electrical box and the drywall to maintain the integrity of the vapor barrier.

Prior solutions include providing a rigid flange surrounding the electrical box to extend outwardly from the box in all directions and to have a first surface and a second surface that are generally parallel with the closed end surface of the box to overlay the vapor barrier. The rigid flange has been provided on a molded PVC box, wherein the flange is integrally molded with the sides and closed end of the electrical box.

Inasmuch as the walls and the sides of the electrical box are required to be substantially rigid, any integrally molded flange has the same rigidity as the sides of the box. The rigidity creates several issues for installers of the box. Imperfections in the studs and other components of the wall require accommodation of differences in tolerance measurements and alignment. While a flexible vapor barrier easily accommodates such imperfections, the rigid flange extending outwardly from the electrical box does not. Thus, the rigid flange causes ripples in the wall and exterior siding, as well as alignment issues and other issues for the electrical box. To alleviate the issues, shaving or adjusting the position of the studs is required to maintain a desired appearance and alignment of the electrical box with both the siding and interior surfaces of the walls.

In many circumstances, the electrical box is installed into an existing wall structure wherein components such as the joists, the studs, the vapor seal, and the layers of drywall are already installed. Electrical boxes used for such applications are typically referred to as "old work" electrical boxes. The introduction of the new electrical box typically requires portions of the wall or ceiling construction, including the drywall and potentially a portion of the vapor seal, to be penetrated and subsequently removed to form an opening having a shape and size corresponding to a shape and size of a periphery of the electrical box. One or more gaps may be created about the periphery of the electrical box if such an opening does not correspond precisely to the shape and size of the periphery of the electrical box. Thus, air may flow between a space in the wall or the ceiling present outboard of the vapor barrier and an interior of the room requiring the opening, thereby reducing a thermal efficiency of the wall or the ceiling.

In commonly owned U.S. Pat. No. 6,908,003, hereby incorporated herein by reference in its entirety, an electrical box having a flexible flange with a first planar surface and a second planar surface generally parallel to the closed end of the box is disclosed.

However, flexible flanges are difficult to install and seal exterior wall vapor barriers and the adherence of such flanges to boxes of various different materials is difficult. Thus, it is highly desirable to provide a new and improved electrical box to address the above-referenced issues and that can be easily secured to the vapor barrier in exterior walls of a building to maintain the integrity therein.

It is also desirable to provide a new and improved electrical box that allows such boxes to be installed in a wall construction while maintaining the integrity of the vapor barrier of the wall construction. Additionally, it is desirable to provide a new and improved electrical box that can provide a seal with the vapor barrier of the exterior wall, or ceiling, to maintain the integrity of the vapor barrier. Lastly, it is desirable to provide a new and improved electrical box that can be mounted in a manner to accommodate any small inconsistencies in dimensions, alignment and the like allowing for fast and efficient installation, while at the same time maintaining planar interior wall surfaces and desired siding construction.

SUMMARY OF THE INVENTION

In concordance and agreement with the instant disclosure, an electrical box assembly having a flange configured to provide a seal between the box and the wall or the structure, has surprisingly been discovered.

The electrical box assembly comprises: a box structure having a closed end and an open end with an interior surface surrounded by a plurality of sidewalls, and a flange disposed intermediate, both, the open end and the closed end of the box and extending laterally outwardly from the plurality of sidewalls, the flange disposed at an angle in respect of an edge of the plurality of sidewalls surrounding the open end of the box.

BRIEF DESCRIPTION OF THE DRAWINGS

The above-mentioned, and other features and objects of the invention, and the manner of attaining them will become more apparent and the invention itself will be better understood by reference to the following description of an embodiment of the invention taken in conjunction with the accompanying drawings, wherein.

DETAILED DESCRIPTION OF THE PREFERRED EMBODIMENT

Figure 1:
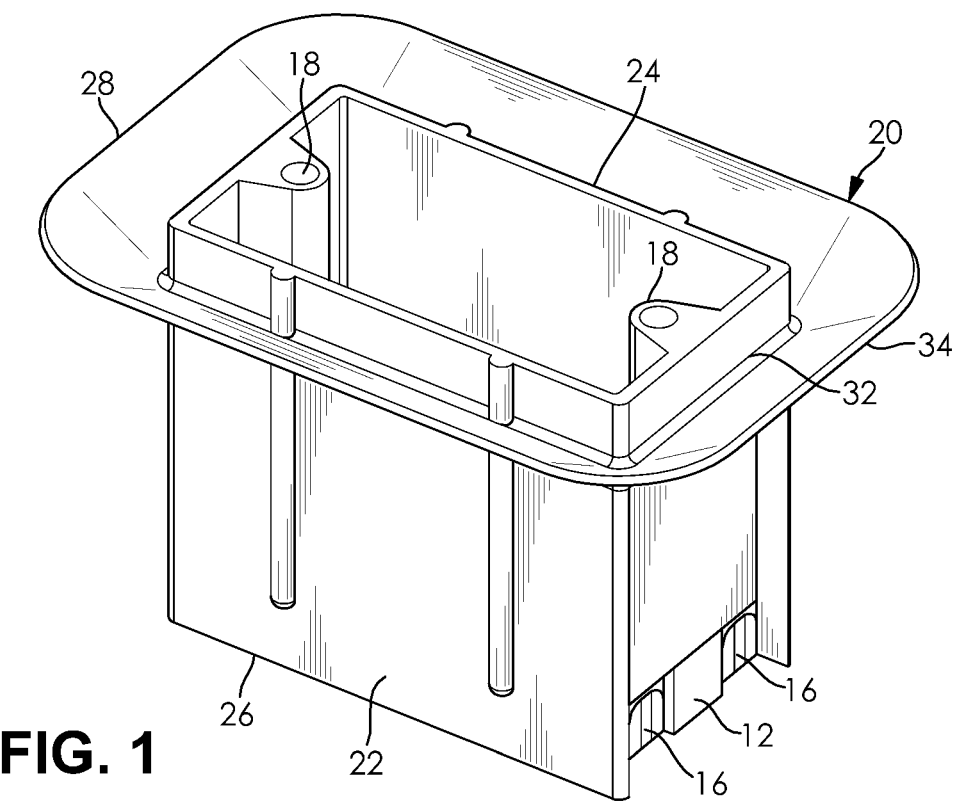
FIG. 1 is a perspective view of an electrical box according to the invention.

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

FIGS. 1-4 illustrate an electrical box 10 according to an embodiment of the disclosure. The electrical box 10 is inclusive of a back or closed end 26, an open end or face 24 and a plurality of sidewalls including upstanding sides 22 and opposite ends 12. The electrical box 10 may be suitable for installation into a finished structure having a layer of material such as drywall already installed. As depicted in the present embodiment, the electrical box 10 is shown to be an outlet box. However, it is understood that the electrical box 10 may be adaptably constructed in various configurations consistent with the housing of electrical components therein. The electrical box 10 shown is presented within a single gang box that is depicted as having a substantially rectangular cross-sectional shape wherein the opposite ends 12 are shorter than the upstanding sides 22. However, alternative configurations of such boxes are also provided in a two gang box, a three gang box, a four gang box and the like. It is also understood that other cross-sectional shapes such as circular may be used for such boxes.

A plurality of knockouts 16 is provided, wherein portions of the opposite ends 12 can be removed to pass cable through to the inside of the electrical box 10 to facilitate electrical connections within the electrical box 10. A plurality of bosses 18 is formed to extend into the electrical box 10 and configured to receive a fastener (not shown) therein to provide a connection for an electrical appliance mounted in the electrical box 10 and a top cover (not shown). However, alternative methods of connecting an associated electrical appliance within the electrical box 10 may be used without departing from the scope of the present invention.

A vapor barrier flange 20 extends laterally outwardly from the upstanding sides 22 and the opposite ends 12 of the electrical box 10. The flange 20 is disposed at an angle with respect to the upstanding sides 22, intermediate the open end 24 of the electrical box 10 and the closed end 26 of the electrical box 10. In the embodiment shown, the angle between the flange 20 and the upstanding sides 22 and the opposite ends is about 60 degrees, although other angles can be used without departing from the scope of the invention. The flange 20 has a first surface 28 and a second surface 30. As shown, the first surface 28 and the second surface 30 are substantially planar and parallel to each other. An inner edge 32 of the flange 20 surrounds and abuts the electrical box 10 to form a vapor tight seal therebetween. A distal edge 34 of the flange 20 is self-supporting and resiliently flexible. As shown, the flange 20 is integrally molded with the electrical box 10 from a polymer material, which allows for the flange to accommodate any small inconsistencies in dimensions, alignment and the like, so as to allow for fast and efficient construction while at the same time maintaining planar interior wall surfaces and desired siding construction. However, it is understood that other materials having desired properties may be used, and both the electrical box 10 and the flange 20 may be produced from different materials, if desired.

The term "self-supporting," as used in the specification herein and in the claims, is understood to mean that when the flange 20 (as is shown in FIG. 1) is in use, the flange 20 supports the weight of the electrical box 10 when the electrical box 10 is secured to a wallboard 36, such as drywall with its opening towards the interior of the structure. The term "resiliently flexible," as used herein means the flange 20 at any position thereof can be bent, and when released, the flange 20 will reassume the position shown in FIG. 1 at room temperature.

Figure 2:
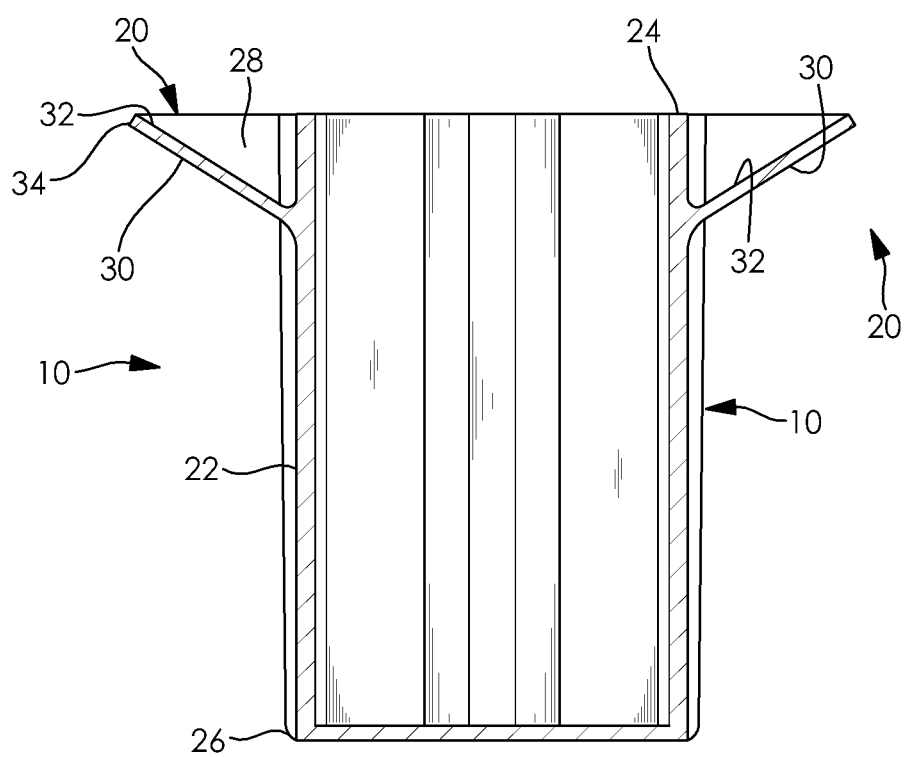
FIG. 2 is a cross-sectional perspective view of the electrical box of FIG. 1.

FIG. 2 shows the flange 20 spaced from the open end 24 a distance to accommodate a thickness of the wallboard 36. Additionally, the surfaces 28, 30 of the flange 20 have a width sufficient to form an adequate seal with the vapor barrier of the wall of the building. As is depicted within the present embodiment, the width of the flange 20 measured from where the flange abuts the electrical box 10 to the distal edge 34 of the flange 20 is approximately 0.5 inches in relation to 0.5 inches of a wallboard 36 abutting the flange 20. Thus, the thickness of the flange 20 has approximately a one-to-one ratio with the thickness of the wallboard 36. However, it is understood that the thickness of the flange 20 can have any ratio relative to the thickness of any wallboard 36.

Figure 3:
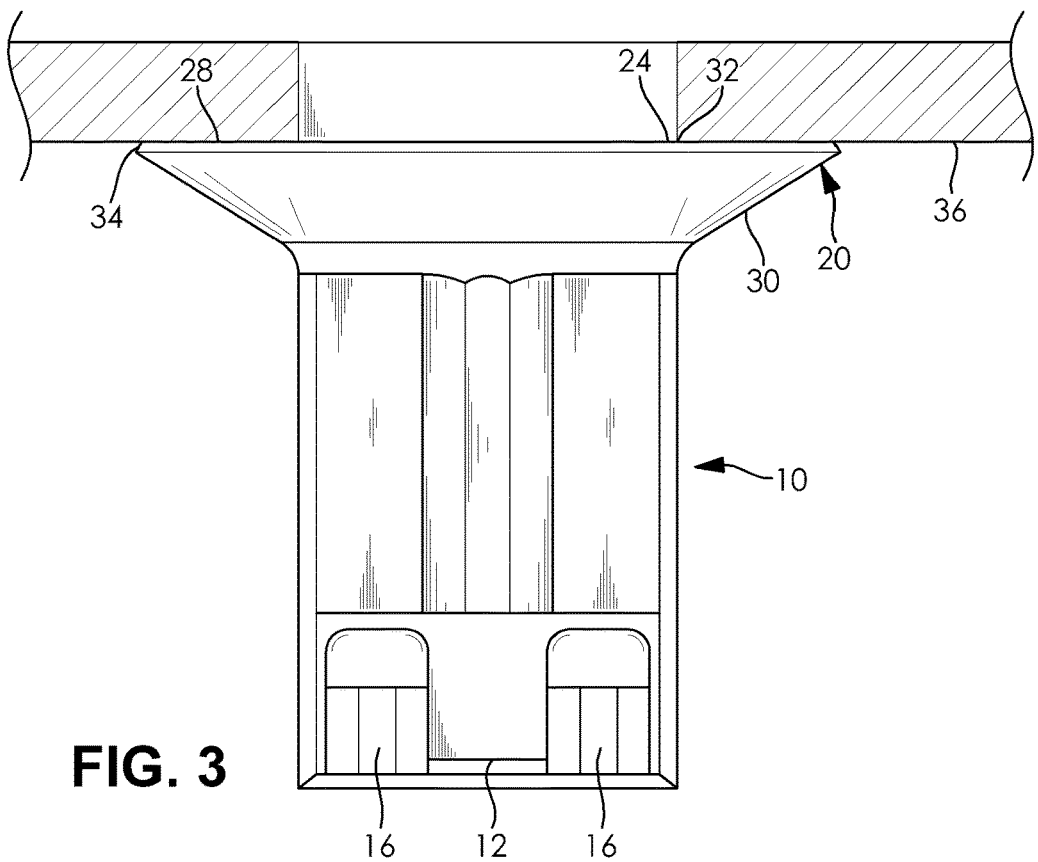
FIG. 3 is a fragmentary top plan view of the electrical box of FIG. 1 at an initial contact of an angled flange with a wall shown in section.
Figure 4:
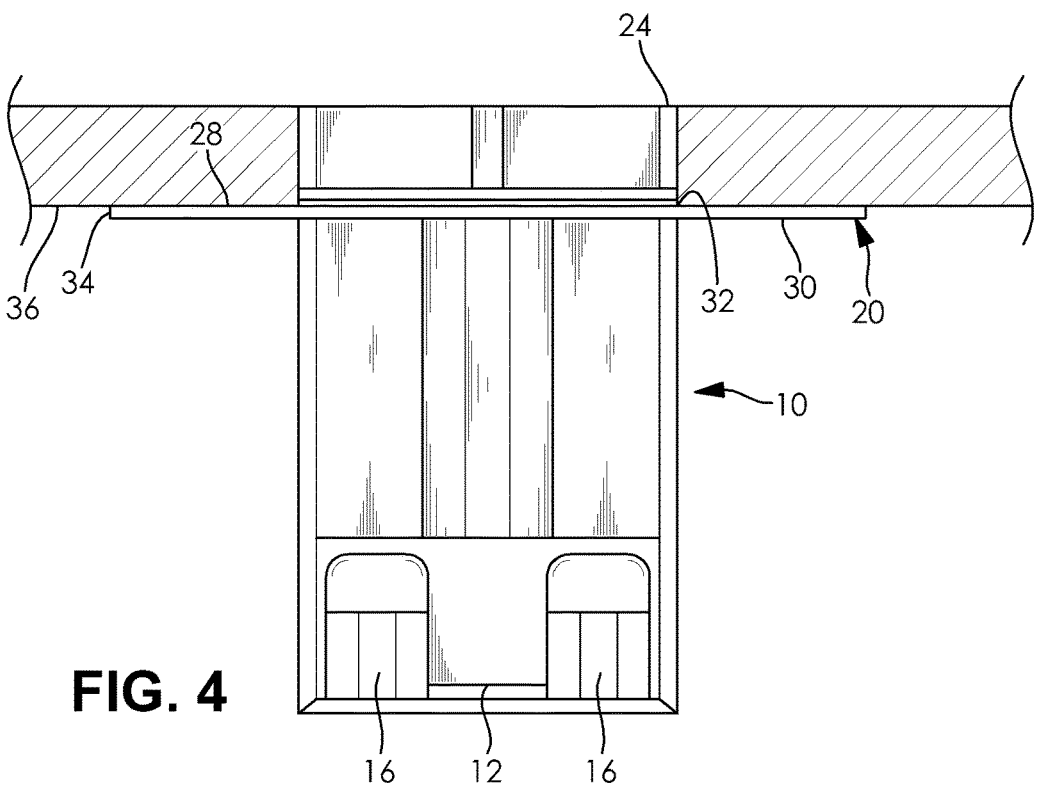
FIG. 4 is a top plan view of the electrical box of FIG. 1 at a final contact of the angled flange with the wall.

Installation of the electrical box is shown in FIG. 3 and FIG. 4. Upon initial contact with the wallboard 36 as shown in FIG. 3, the flange 20 is disposed at an angle with respect to the wallboard 36. During installation, the open end 24 of the electrical box 10 is facing an interior of the structure (e.g. an inside room of a building). Upon initial contact with the wallboard 36, the distal edge 34 of the flange 20 initially engages the wallboard 36 of the structure due to the angle of the flange 20.

When the electrical box is fully installed as shown in FIG. 4, the flange 20 is flattened or substantially coplanar with a surface of the wallboard 36. Since the flange is flattened and is urged against the surface of the wallboard 36, a vapor seal is created between the electrical box 10 and the wallboard 36. The top cover (not shown) encloses the electrical box 10 and overlays a peripheral portion of interior material of the wallboard 36 adjacent the electrical box 10. The transition from the initial contact the electrical box 10 has with the wallboard 36 to when it is fully installed is influenced by a flexing of the flange 20. As the transition takes place, the flange 20 flexes to compressively flatten against the wallboard 36 to create a vapor seal around peripheral gaps which may surround the electrical box 10. This is made possible by the polymer material the flange 20 is formed from as it allows for the flange 20 to be flexibly compressed to form the vapor seal around the wallboard 36. The electrical box 10 is further secured by a plurality of fasteners (not shown) that engage the plurality of bosses 18 to prevent unintentional displacement.

An electrical box utilizing a vapor barrier flange 20 shown and described herein provides numerous benefits over an electrical box devoid of such a vapor barrier flange. First, the polymer material the flange is formed from allows the flange the flexibility to accommodate small imperfections in the wallboard as the flange is sealed against the wallboard when installed. Such imperfections may include gaps created about the periphery of the electrical box due to imprecise measurements related to the shape and size of the periphery of the electrical box, as well as protruding studs and other components of the wall that require accommodation of differences in tolerance measurements and alignment, for example. Second, as the flange compressively flattens against the wallboard a vapor seal is created between the flange and the wallboard which prevents the flow of air around the exterior surface of the electrical box. Lastly, the vapor seal is further supported by fasteners that are installed within the plurality of bosses to secure the electrical box to the wallboard. The fasteners that are installed within the plurality of bosses also aids in the support of the positioning of the electrical box relative to the opening of the building structure to prevent undesired movement of the electrical box.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box comprising:
   a box having a closed end and an open end and an interior surrounded by at least one sidewall extending from the open end to the closed end; and
   an angled flange formed integrally with the at least one sidewall as a monolithic structure, the angled flange extending laterally outwardly from an inner edge merging with the at least one sidewall to a distal edge, wherein the inner edge is disposed intermediate and spaced apart from each of the open end and the closed end of the box, wherein the angled flange is configured to be disposed at a first angle of less than 90 degrees with respect to the at least one sidewall, wherein the angled flange is configured to resiliently flex about the inner edge thereof.

2. The electrical box of claim 1, wherein the angled flange is resiliently flexible between a first position when the angled flange is disposed at the first angle and a second position when the angled flange is disposed at a second angle with respect to the at least one sidewall, wherein the angled flange is substantially coplanar with a wallboard into which the electrical box is installed when the angled flange is the second position, and wherein a spacing of the inner edge of the angled flange from the open end of the box remains constant such that an origin of the first angle is the same as the origin of the second angle.

3. The electrical box of claim 2, wherein the angled flange forms a vapor seal with the wallboard.

4. The electrical box of claim 1, wherein the inner edge of the angled flange is spaced from the open end of the electrical box to accommodate a thickness of the wallboard.

5. The electrical box of claim 1, wherein the angled flange has a thickness equal to a thickness of a wallboard into which the electrical box is installed.

6. The electrical box of claim 1, wherein the inner edge of the angled flange is directly integrally molded with the at least one sidewall.

7. The electrical box of claim 6, wherein the box and the angled flange are formed from a polymer material.

8. The electrical box of claim 7, wherein the at least one sidewall and the angled flange have a rectangular cross-sectional shape.

9. The electrical box of claim 1, wherein the at least one sidewall and the angled flange have a rectangular perimeter shape.

10. The electrical box of claim 1, wherein the angled flange is disposed proximate the open end of the electrical box.

11. The electrical box of claim 1, wherein a plurality of bosses is formed in the electrical box.

12. The electric box of claim 1, wherein the at least one sidewall is continuously planar.

13. The electric box of claim 1, wherein a distal edge of the angled flange is self-supporting.

14. The electric box of claim 1, wherein the first angle is about 60 degrees.

15. The electrical box of claim 1, wherein the angled flange rotates about a pivot point defined by the inner edge of the angled flanged, the pivot point remains at the same distance from the open end of the box and with respect to an inner surface of the at least one sidewall defining the interior during a rotation of the angled flange.

16. A method of creating a vapor seal between a wallboard and an electrical box comprising the steps of:
   positioning the electrical box in an opening in a wallboard, the electrical box having a closed end, an open end, an interior surrounded by at least one sidewall extending from the open end to the closed end, and an angled flange formed integrally with the at least one sidewall as a monolithic structure, the angled flange extending from an inner edge merging with the at least one sidewall to a distal edge, wherein the inner edge is disposed intermediate and spaced apart from each of an open end and a closed end of the electrical box, the angled flange extending laterally outwardly from the at least one sidewall at an angle of less than 90 degrees relative to the at least one sidewall, wherein the distal edge of the angled flange engages the wallboard;
   urging the electrical box against the wallboard, wherein the angled flange resiliently flexes about the inner edge thereof and flattens to assume a coplanar position with respect to the wallboard, and wherein the inner edge remains stationary with respect to a distance from the open end as the angled flange flattens to assume the coplanar position.

17. The method of claim 16, further comprising the step of providing a fastener to engage a boss of the electrical box, thereby compressively securing the electrical box to the wallboard.

* * * * *